US010939202B2

(12) United States Patent
Stoltze et al.

(10) Patent No.: US 10,939,202 B2
(45) Date of Patent: Mar. 2, 2021

(54) CONTROLLING THE DIRECTION OF A MICROPHONE ARRAY BEAM IN A VIDEO CONFERENCING SYSTEM

(71) Applicants: Holger Stoltze, Billerica, MA (US); Ryo Tanaka, Concord, MA (US); Pascal Cleve, Sudbury, MA (US)

(72) Inventors: Holger Stoltze, Billerica, MA (US); Ryo Tanaka, Concord, MA (US); Pascal Cleve, Sudbury, MA (US)

( * ) Notice: Subject to any disclaimer, the term of this patent is extended or adjusted under 35 U.S.C. 154(b) by 126 days.

(21) Appl. No.: 15/945,893

(22) Filed: Apr. 5, 2018

(65) Prior Publication Data
US 2019/0313187 A1 Oct. 10, 2019

(51) Int. Cl.
H04R 3/00 (2006.01)
H04R 1/40 (2006.01)
G10L 21/0232 (2013.01)
G10L 25/78 (2013.01)
H04R 3/04 (2006.01)
H04N 7/15 (2006.01)
G10L 21/0208 (2013.01)

(52) U.S. Cl.
CPC .......... H04R 3/005 (2013.01); G10L 21/0232 (2013.01); G10L 25/78 (2013.01); H04R 1/406 (2013.01); H04R 3/04 (2013.01); G10L 2021/02082 (2013.01); H04N 7/15 (2013.01)

(58) Field of Classification Search
CPC ... H04M 3/568; H04M 9/082; G10L 21/0208; G10L 2021/02082; H04R 1/406; H04R 3/005; H04R 2201/401; H04R 2203/12; H04R 2430/20; H04R 2430/23
USPC ...................................................... 348/14.09
See application file for complete search history.

(56) References Cited

U.S. PATENT DOCUMENTS

| 9,516,409 | B1* | 12/2016 | Ramprashad | ............ H04B 3/23 |
| 2006/0269278 | A1* | 11/2006 | Kenoyer | ............... G06F 1/1607 |
| | | | | 396/428 |
| 2012/0189147 | A1* | 7/2012 | Terada | .................. H04R 25/407 |
| | | | | 381/313 |
| 2016/0300584 | A1* | 10/2016 | Pandey | .................. H04R 3/005 |
| 2017/0244942 | A1* | 8/2017 | Ma | ........................ H04N 9/3152 |
| 2019/0156847 | A1* | 5/2019 | Bryan | ................... G10L 21/028 |

* cited by examiner

Primary Examiner — Rasha S Al Aubaidi
(74) Attorney, Agent, or Firm — Robert Schuler

(57) ABSTRACT

A video conferencing system has a microphone array that operates to receive acoustic signals corresponding to voice activity and to determine that the signals are either from within a sound field of interest and from outside the sound field of interest, and if the signals are from outside the sound field of interest the system attenuates these signals by not steering a microphone array beam towards these signals.

16 Claims, 8 Drawing Sheets

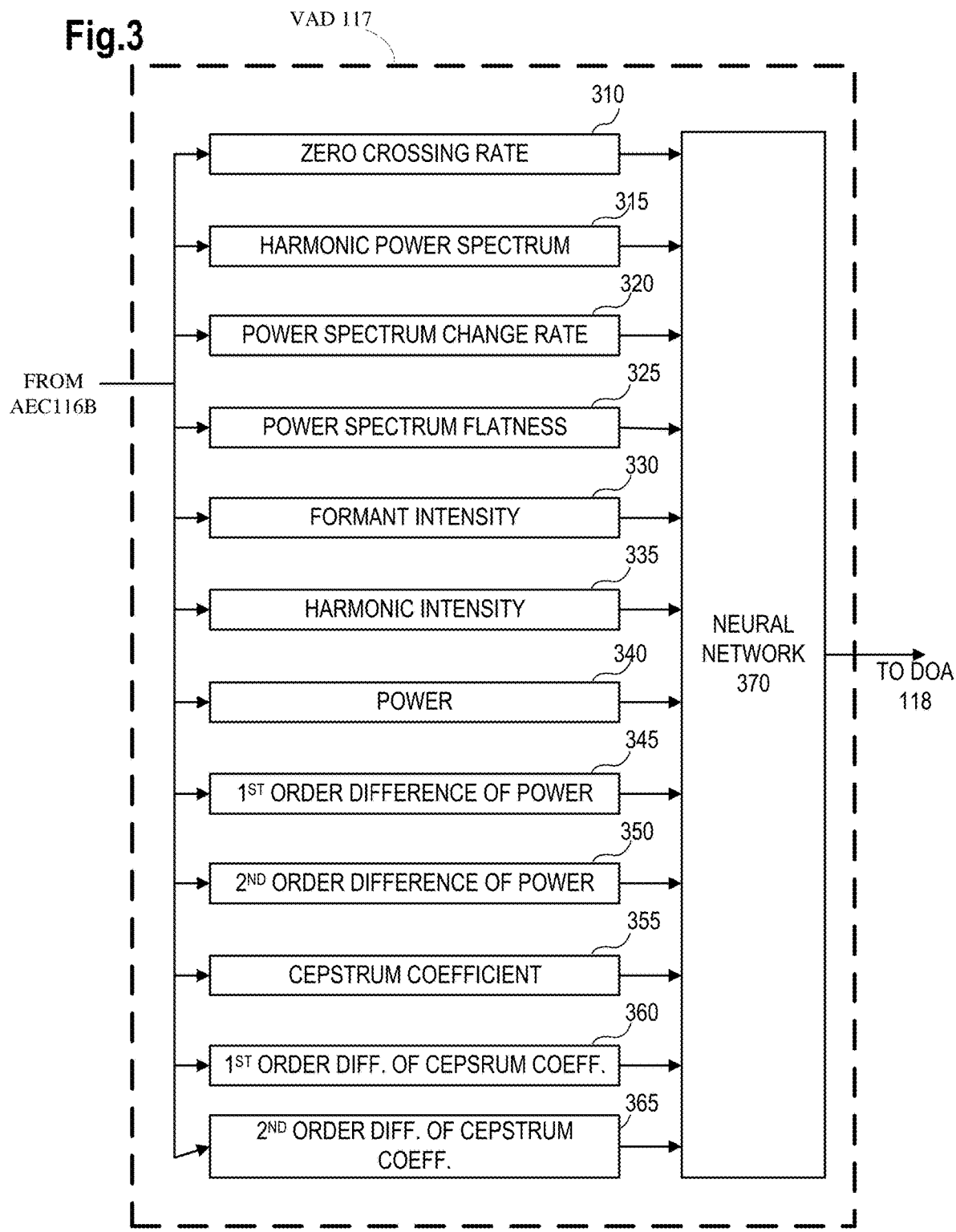

CONTROLLING THE DIRECTION OF A MICROPHONE ARRAY BEAM IN A VIDEO CONFERENCING SYSTEM

1. FIELD

This disclosure relates to microphone array beamforming operation, and to methodologies employed to capture sound information from an acoustic source of interest within a sound field and to attenuate sounds from sources outside the sound field.

2. DESCRIPTION OF THE RELATED ART

Meetings conducted in two separate locations with at least one of the locations involving two or more individuals can be facilitated using an audio or video conferencing system, both of which are referred to herein as a conferencing system. Audio conferencing systems typically include some number of microphones, at least one loudspeaker, and functionality that operates to convert audio signals into a format that is useable by the system. Video conferencing systems can include all the functionality associated with an audio conferencing system, plus they can include cameras, displays and functionality for converting video signals into information useable by the system. In either type of conferencing system, microphones can operate to pick up audio signals (speech) from a local source and transmit the signals to a base station which generally operates to provide session control and to process information in the signals in several ways before sending it over a network to a remote communication device to be played by a loudspeaker. Among other things, the conferencing system can be configured with functionality to amplify audio signals, it can regulate microphone signal gain (automatic gain control or AGC), suppress noise, it is typically configured with functionality that operates to remove acoustic echo present in a microphone signal, and it can have microphone array beamforming functionality.

Conferencing systems typically implement one or more audio signal processing methods to improve the quality of audio signals captured by an array of microphones. In this regard, microphone array beamforming functionality is typically implemented in conferencing systems as a means to improve the quality of audio signals received for a particular audio source of interest by reinforcing audio information received from a particular direction, and by attenuating audio information received from other directions. This beamforming functionality can be implemented with either fixed or variable beams, and the particular fixed beam or the orientation of a variable beam can be determined based upon a direction of arrival of an audio signal from an audio source, such as a speaker.

3. BRIEF DESCRIPTION OF THE DRAWINGS

FIG. 3 shows functional elements comprising a voice activity detector 117 comprising the conferencing system 110.

4. DETAILED DESCRIPTION

Figure 1:
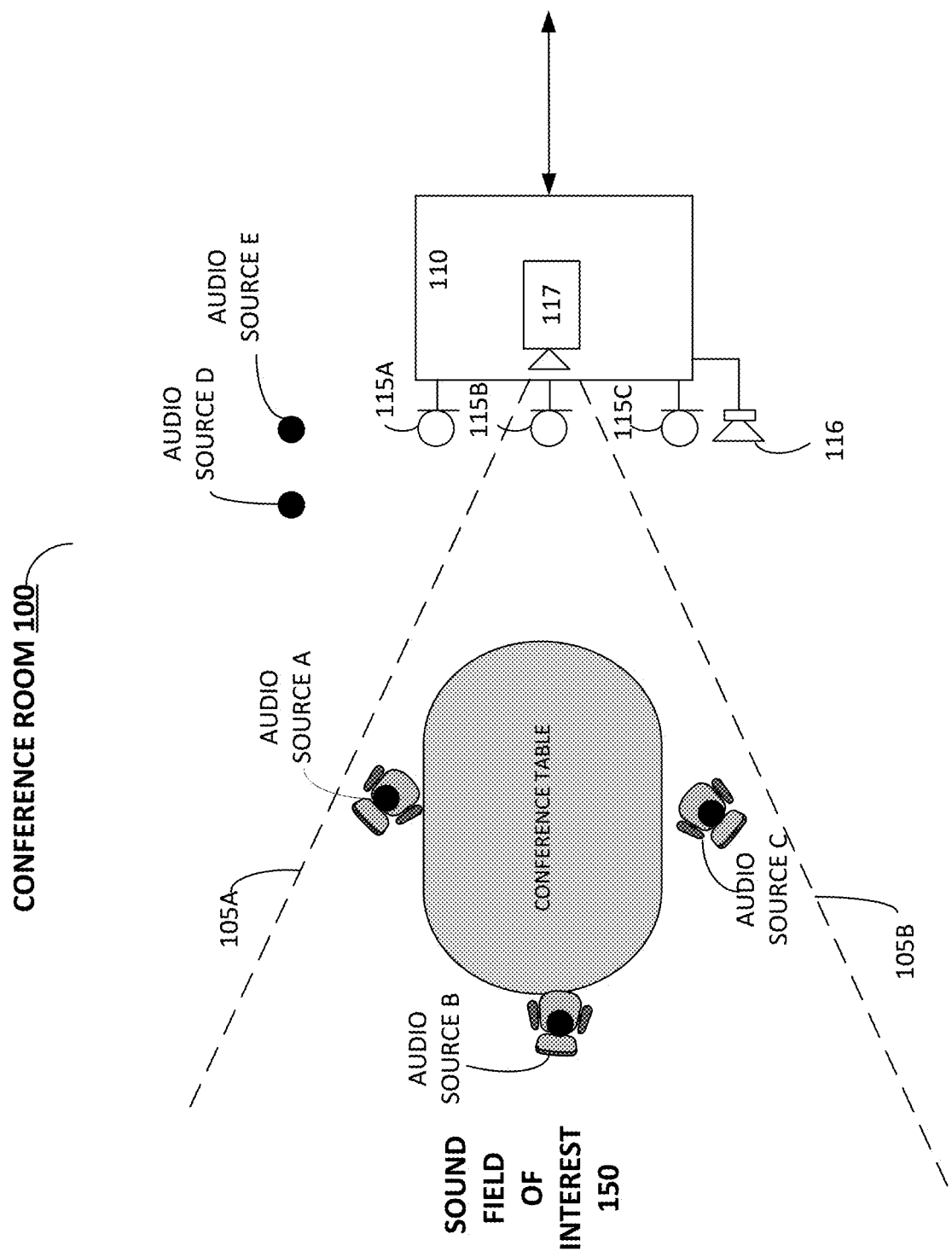
FIG. 1 is a diagram showing a conference room 100 with a conferencing system 110, table, chairs and two audio sources.

Video conferencing systems have at least one camera that captures video image information in a video field of view. Depending upon a camera lens focal length, this field of view can be relatively wide or narrow, and this field of view can be fixed or variable depending upon whether the lens is fixed or variable (i.e., zoom lens). Typically, acoustic information (i.e., speech/voice/audio information) generated by sound sources outside the field of view of a camera lens are not of interest to participants (either or both local and remote participants) in a video conference session, or individuals may have positioned themselves off-camera in order to have a private conversation. However, a microphone array beamformer typically operates using sound direction of arrival information that is not limited to a particular sound field of interest, which in most cases corresponds to the field of view of a camera lens. As a result, audio information generated by off-camera speakers is combined with on-camera audio information in an audio stream that is sent to and played by a remote communication device (whether another conferencing system of other type of communication device). This off-camera audio information can denigrate the quality of a conferencing session by creating confusion with respect to the origin of audio information, such as which speaker is currently talking, or the mixture of audio information generated by multiple sources can result in the local speech being unintelligible or lower the intelligibility of this audio stream, or a private conversation between off-camera individuals can be inadvertently disclosed to remote conferencing session participants.

We have designed a video conferencing system having beamformer functionality that can be controlled to attenuate sound energy corresponding to voice activity that arrives at a microphone array from outside a sound field of interest by controlling a microphone array beam to only steer towards sound sources that are within the sound field of interest, such as within the field of view of a video camera associated with the conferencing system. With knowledge of a current camera field of view, the conferencing system can attenuate sound energy by controlling the beamformer to not update the direction of a beam so that it is steered towards a sound source that is not within the current camera field of view. If the field of view is variable and changing from one video conference session to another, or during a single video conference session, the beamformer can use variable field of view information to expand or contract the sound field of interest as the field of view changes.

According to one embodiment, sound direction of arrival (DOR) information associated with speech activity is used by the beamformer to determine whether a sound source generating an audio signal is within or outside the current sound field of interest. In the event that an audio signal is detected, and it is determined that the DOA of the signal does not correspond to a current, valid sound field of interest (i.e., the current camera field of view), then the beamformer can be prevented from updating the current beam direction. Alternatively, the audio signal detected from a direction that is outside the sound field of interest can be attenuated, and the beamformer can be prevented from updating the current beam direction. From a different perspective, when it is determined that the direction of arrival of an audio signal is outside the sound field of interest, the beamformer is prevented from recalculating a direction for a beam, and the sound energy in the audio signal is simply attenuated. These and other embodiments are disclosed in the following description with reference to the Figures.

FIG. 1 is a diagram illustrating a conference room 100 having a video conference system 110 comprised of an array of microphones 115A, 115B and 115C, a loudspeaker 116 and a camera 117. The conference room also has a conference table around which are positioned three chairs and associated audio sources A, B and C (i.e., video conference participants), and audio sources D and E. FIG. 1 also shows a sound field of interest 150 that is comprised of the area between dashed lines labeled 105A and 105B, and two audio sources D and E which are outside the sound field of interest. The sound field of interest in this case corresponds to the camera field of view which can be either fixed or variable. While FIG. 1 illustrates the field of view in two dimensions, it should be understood that this field is three dimensional (i.e., the field has height, width and depth components), and so in this respect the field has volume. The field volume can be determined by the focal length of a camera lens and by the size and geometric shape of a camera sensor component.

According to one embodiment, the conferencing system 110 operates to only steer a microphone array beam to the direction of arrival of sound that is within the sound field of interest 150, and from another perspective the system 110 prevents the beam from being steered in the direction of sound arriving from outside the sound field of interest. Any one of the audio sources, Source A, Source B or Source C can generate audio information (i.e., speech), and the reception of this audio information can cause the system 110 to steer a microphone array beam to the direction of that source which has the effect of reinforcing sound from the source and attenuating sound to either side of the beam. While audio information received from a source outside the sound field of interest 150 can be completely attenuated, this can lead to audio sent to a far-end being choppy to the extent that period of sound and no sound would be heard. Alternatively, if the system 110 detects sound arriving at the microphone array from a direction that is outside the sound field of interest, it can prevent a beam from being steered in that direction, and attenuate the sound arriving from this direction. A more detailed description of functionality implemented in the conferencing system 110 that operates to process audio information received by the system is described below with reference to FIG. 2A.

Figure 2A:
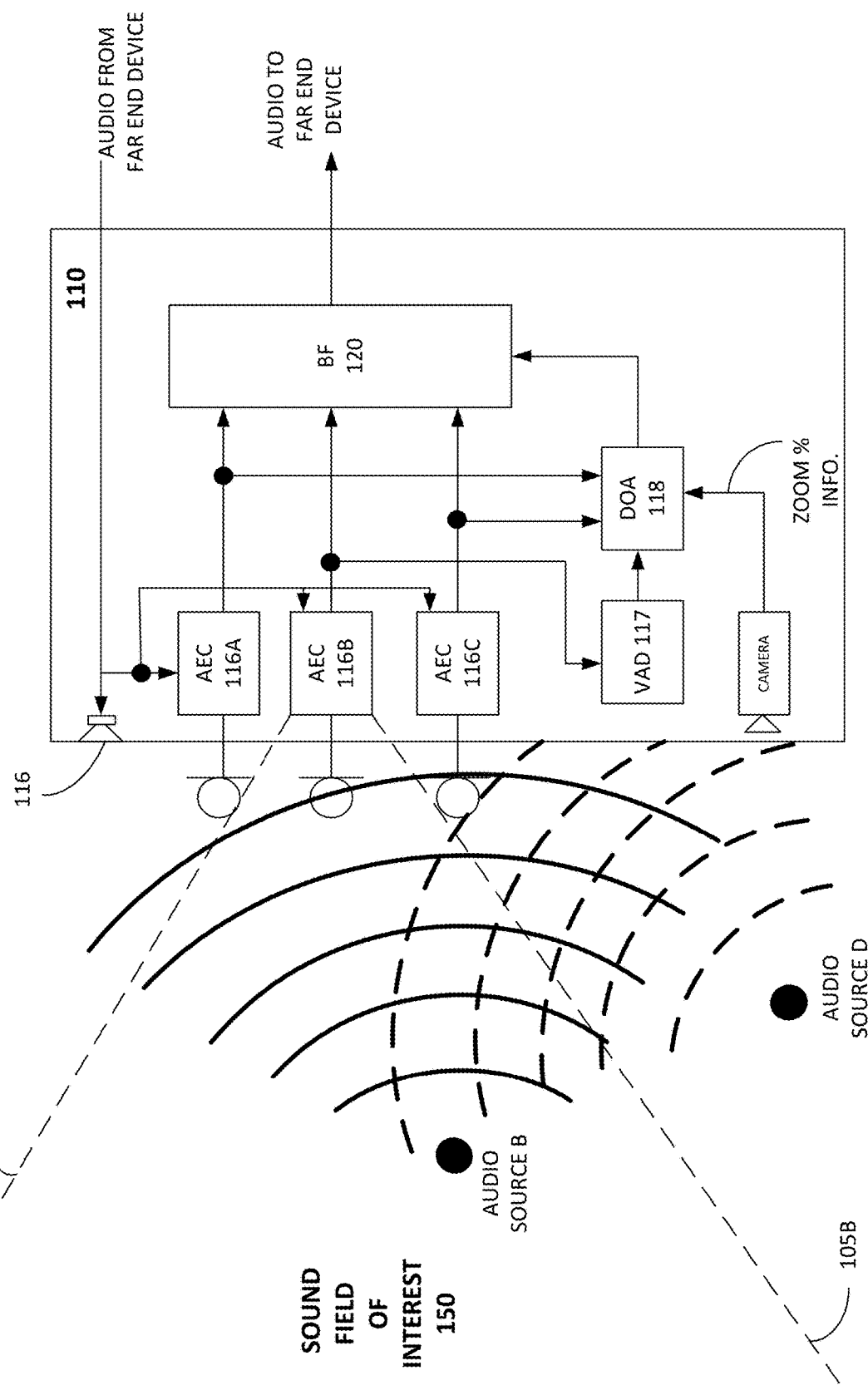
FIG. 2A is a diagram showing the conferencing system 110 and illustrating a sound field of interest.

FIG. 2A is similar to FIG. 1 in that it shows the conference room 100 having the conference system 110 and multiple audio sources, the Source B that is located within the sound field 150, and Source D that is not within the sound field 150. The conferencing system 110 has the same microphone array 115 (not labeled in this case), camera and speaker as shown in FIG. 1, and FIG. 2 also shows functionality employed to process audio signals received from the audio sources in the room. Specifically, each one of the respective microphones, 115A, 115B, and 115C, in the microphone array 115 is connected to separate acoustic echo cancellation function 116A, 116B and 116C, each of which operate on an audio signal received from the microphones to remove acoustic echo. The output of each AEC functions is sent to a beamforming function (BF) 120 that operates to steer a microphone array beam to a direction of arrival of sound information as determined by a direction of arrival module (DOA) 118. The conferencing system 110 also has a voice activity detector 117 that operates to distinguish between speech and non-speech sound received by the microphone array.

Continuing to refer to FIG. 2A, in operation the microphone array 115 receives audio information (i.e., sound), the audio information is sampled and converted to digital information (if not already in a digital format), by sampling and A/D conversion functionality not shown) and the resulting digitized samples of audio information are sent to the respective AEC functions where acoustic echo in the room 100 is removed from each microphone signal. A detailed discussion of AEC operation will not be undertaken here, as this functionality is well known to those in the field of audio science. The output from AEC 116B is sent to the voice activity detector (VAD) 117 where it is determined whether the audio information is speech or non-speech information, and the output (voice or non-voice flag) of the VAD is sent to the direction of arrival detector 118 which operates on the outputs of AEC 116A and 116C to determine the direction of arrival of sound received by the microphone array. A detailed discussion of the VAD and the DOA detectors is undertaken with reference to FIGS. 3 and 4 respectively. In the event the speech activity is detected, the DOA detector uses the audio information from microphones 115A and 115 to determine the direction (See FIG. 2B for DOA calculation) from which the audio arrived at the microphones, and this DOA information is sent to the BF 120, and if the DOA of sound is from within the field of interest, the BF 120 operates to steer a beam to the direction of the sound.

FIG. 2A also illustrates the sound field of interest 150 which is shown in two dimensions and is bounded by the dashed lines labeled 105A and 105B. The audio source B referred to earlier in FIG. 1 is shown to be generating audio information in the form of sound waves, illustrated as solid, curved lines, and the audio source D referred to earlier in FIG. 1 is shown generating audio information in the form of sound waves, illustrated by dashed, curved lines. The sound waves from both Sources B and D arrive at the microphone array from different directions, and each direction of arrival can be calculated, as will be described below with reference to FIG. 2B. As can be seen in FIG. 2A, the sound from audio source B arrives at the microphone array from a direction that is within the sound field of interest 150, and the sound from audio source D arrives at the microphone array from a direction that is not within the sound field of interest 150. The sound field of interest, from the perspective of the conferencing system 110, can be defined as a range of DOA angles (Θ) to either side of an imaginary line that is normal to the microphone array.

Figure 2B:
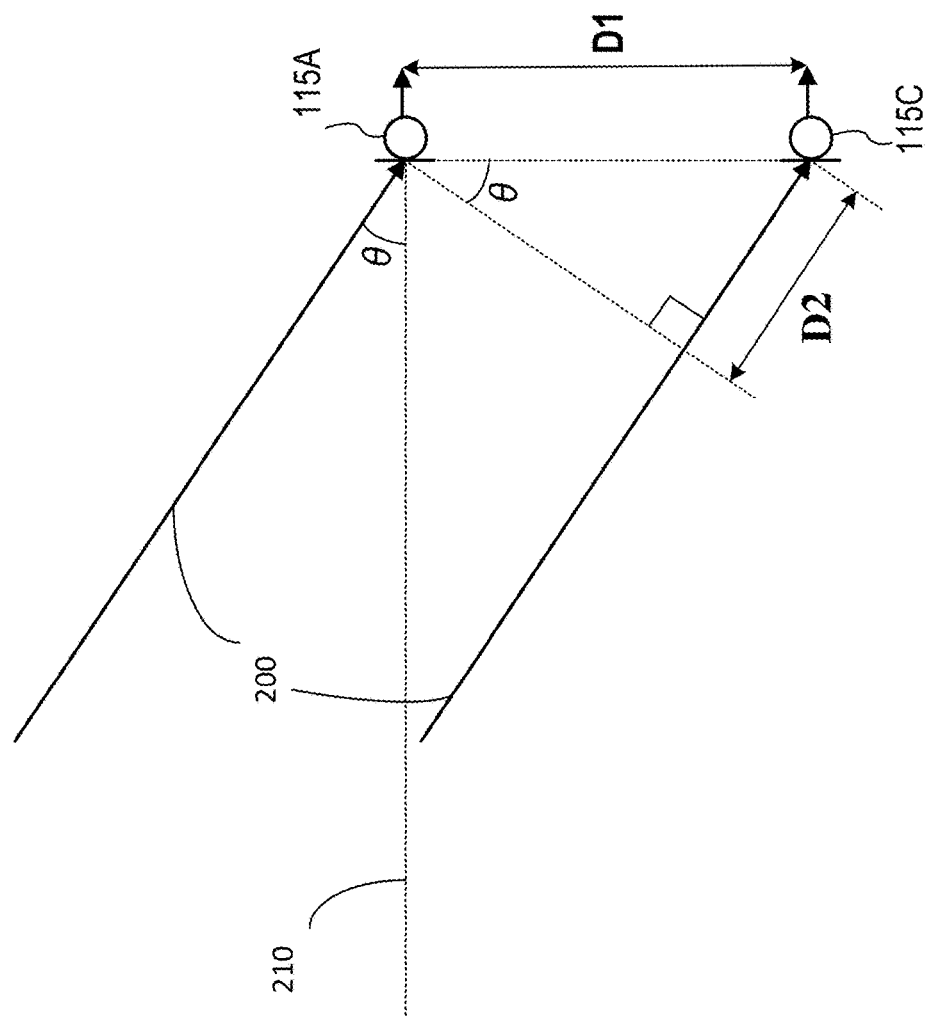
FIG. 2B is a diagram illustrating the elements considered in calculating a sound direction of arrival.

As illustrated in FIG. 2B, the direction of arrival θ of sound 200 (represented here as rays) generated by an audio source (not shown) is illustrated as arriving at an angle with respect to a reference line 210 that is oriented normal to the front plain of the microphone array 115. The sound DOA at the front of the microphone array can be calculated using Equation 1 below, in which D1 is a known distance between the microphones 115A and 115C, (τ) a detected delay or difference in time of arrival of the sound between the microphones 115A and 115C, and C is the speed of sound is C.

$$\theta = \sin^{-1}\frac{D2}{D1} \qquad \text{Equation 1}$$

Wherein the distance D2 is equivalent to the product of the difference in time of arrival (τ) between microphones 115A and 115C, and the speed of sound C (i.e., Cτ).

Prior to determining the DOA of sound at the microphone array, it is necessary to determine that the sound detected by the microphones is voice information as opposed to sound of no interest to participants in a conferencing session. In order to discriminate between voice information and noise information, the conference system 110 employs the VAD 117 briefly described earlier with reference to FIG. 2A. The VAD 117 carries out an analysis of various voice features in a sound signal using a neural network 57. In the event that voice activity is detected, the VAD generates a voice flag indicator signal that is sends to the DOA module 118. The operation of functionality comprising of the VAD 117 will now be described in detail with reference to FIG. 3.

With reference to FIG. 3, the following list of voice features can be analyzed by the VAD in order to identify voice activity: zero-crossing rate 310, harmonic power spectrum 315, power spectrum change rate 320, power spectrum flatness3, formant intensity 330, harmonic intensity 335, power 340, first-order difference of power 345, second-order difference of power 350, cepstrum coefficient 355, first-order difference of cepstrum coefficient 360, and second-order difference of cepstrum coefficient 365.

The zero-crossing rate 310 calculates the frequency of appearance of a point that crosses zero for a voice signal in the time domain. Zero cross corresponds to the pitch which is the fundamental frequency of the voice. The harmonic power spectrum 315 indicates what degree of power the frequency component of each harmonic included in the voice signal has. The power spectrum change rate 320 indicates the rate of change of power to the frequency component of the voice signal. The power spectrum flatness 325 indicates the degree of the swell of the frequency component of the voice signal. The formant intensity 330 indicates the intensity of the formant component included in the voice signal. The harmonic intensity 335 indicates the intensity of the frequency component of each harmonic included in the voice signal. The power 340 is the power of the voice signal. The first-order difference of power 345, is the difference from the previous power 340. The second-order difference of power 350, is the difference from the previous first-order difference of power 345. The cepstrum coefficient 455 is the logarithm of the discrete cosine transformed amplitude of the voice signal. A first-order difference 360 of the cepstrum coefficient is the difference from the previous cepstrum coefficient 355. A second-order difference 365 of the cepstrum coefficient is the difference from the previous first-order difference 360 of the cepstrum coefficient. It should be noted that a voice signal emphasizing a high frequency may be used when finding the cepstrum coefficient 355 by using a pre-emphasis filter, and a discrete cosine transformed amplitude of the voice signal compressed by a mel filter bank may be used. It should be understood, that the voice features are not limited to the parameters described above, and any parameter that can discriminate a human voice from other sounds may be used.

The neural network 370 in FIG. 3 is a mathematical model made up of a known number of nodes and layers used to determine whether a current audio frame is human voice or not. The value at each of these nodes is computed by multiplying the values of the nodes in the previous layers with weights and adding some bias. These weights and bias are obtained beforehand for every layer of the neural network 370 by training it with a set of known examples of speech and noise files. The input to the neural network 370 comprises of features 310 to 365 extracted from the audio frame and the output of the final layer are two values representing human voice and noise probabilities. Thus, by calculating the human voice probability, the neural network 370 is able to determine if the sound information received from the AEC 116B is human voice or not. As indicated earlier, the output from the VAD 117 is a voice flag signal to the DOA 118, and the operation of the DOA is described below with reference to FIG. 4A.

Figure 4A:
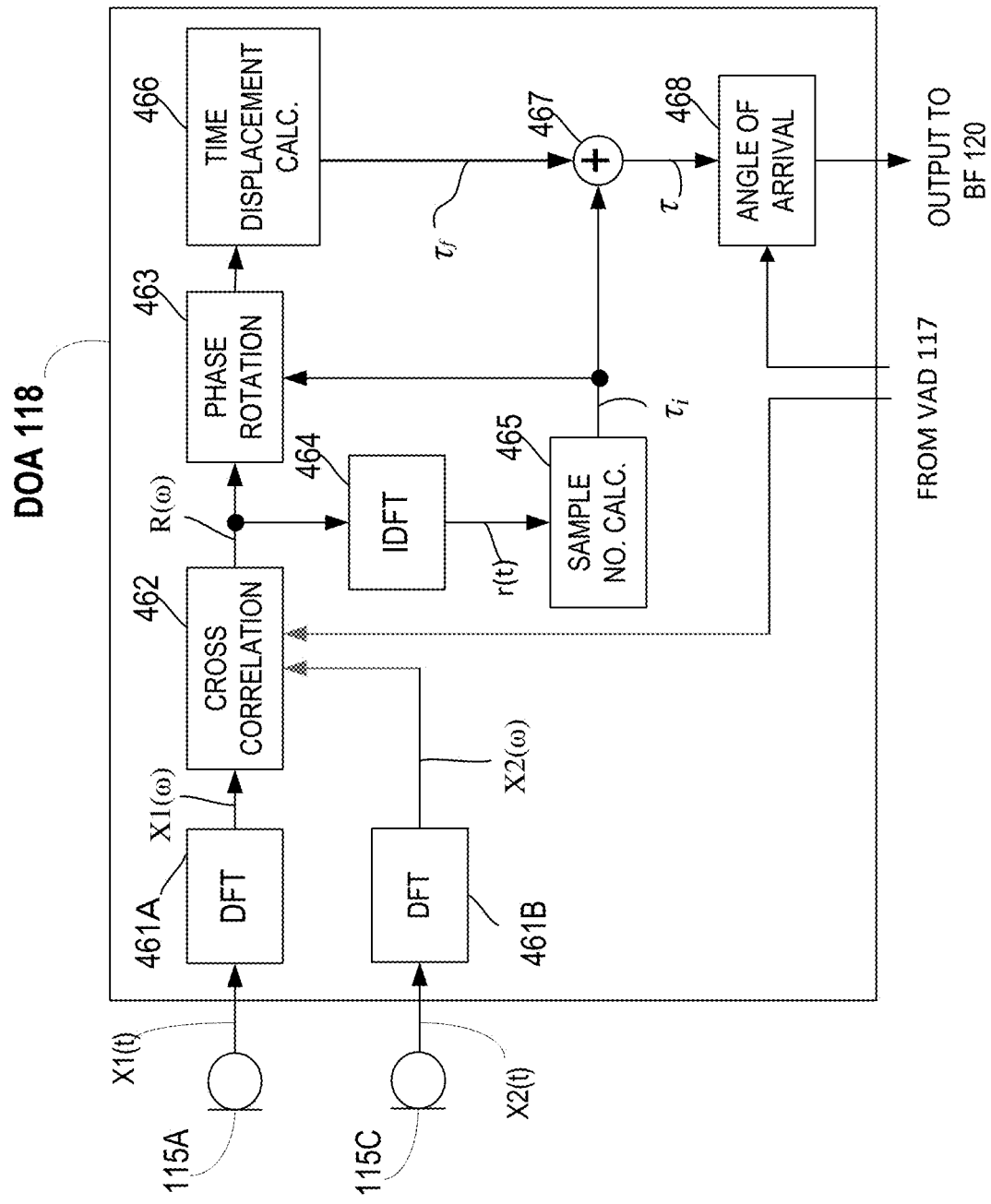
FIG. 4A is a diagram showing the functional elements comprising a direction of arrival function 118.

FIG. 4A is a functional block diagram illustrating functionality comprising the direction of arrival (DOA) module 118 briefly described earlier with reference to FIG. 2A. While a particular DOA module implementation is described here, other implementations can also operate in the conference system 110, and the particular implementation described here is not exclusive to this conference system. The DOA module 118 has discrete Fourier transforms (DFT) 461A and 461B, a cross-correlation function calculation unit 462, a phase rotation unit 463, an inverse discrete Fourier transform (IDFT) 464, sample number calculation unit 465, time displacement calculation unit 466, an adder 467, and an angle of arrival calculation unit 468.

The DFTs 461A and 461B receive the sound signals ($X1(t)$ and $X2(t)$ from the microphones 115A and 115C respectively. Note that the AEC modules 116A and 116C are omitted in FIG. 4, but the sound signal information received by the DFT modules is echo removed sound information. It should be understood that, while in this example shows the DOA 118 using the sound signals received from microphone 115A and 115C, sound information from other microphones can also be used. However, because the direction of arrival of the sound source is estimated using the distance between microphones, the accuracy is higher if the distance between microphones is as large as possible given the microphone configuration of the conferencing system. The DFT modules 461A and 461B perform a Fourier transformation on the information in the sound signals $X1(t)$ and $X2(t)$, and transform them into signals $X1(\omega)$ and $X2(\omega)$ in the frequency domain.

The cross-correlation function calculation unit 462 calculates the whitening cross spectrum $R(\omega)$ of the collected sound signals $X1(t)$ and $X2(t)$ following formula 1 below. Note that a predetermined time constant is applied to the whitening cross spectrum $R(\omega)$.

$$R(\omega) = a \cdot R(\omega) + (1-a) \cdot \frac{conj(X1(\omega)) \cdot X2(\omega)}{|conj(X1(\omega)) \cdot X2(\omega)|} \quad \text{Equation 2}$$

The calculated whitening cross spectrum $R(\omega)$ is input to the phase rotation function 463 and the IDFT 464. The IDFT carries out an inverse transformation on the whitening cross spectrum $R(\omega)$ resulting in a whitening cross-correlation function in the time domain, $r(t)$, that is the input to the sample number calculation module 465. The sample number calculation unit 465 operates to find the peak position index of the whitening cross-correlation function $r(t)$. This peak position index corresponds to the sample number difference in time of arrival of the microphone 115A and the microphone 115C. The sample number calculation module 465 finds the difference in time of arrival (first difference in time of arrival $\tau_i$) of a sound from the sound source to the microphone 115A and the microphone 115C by dividing the peak position index by the sampling frequency as shown in Equation 3 below.

$$\tau_i = \frac{\text{PEAK\_INDEX}(r(t))}{fs} \quad \text{Equation 3}$$

Because the first difference in time of arrival $\tau_i$ is a time difference corresponding to a sample when the cross-correlation function or whitening cross-correlation function shows a peak, it cannot obtain accuracy equal to or greater than the sampling frequency. Therefore, the DOA module 118 can calculate a second difference in time of arrival, which is a difference in time of arrival during one sample, by correcting the whitening cross spectrum R (ω) based on the first difference in time of arrival, and analyzing the corrected whitening cross spectrum R'(ω). This correction is performed by the phase rotation unit 463 rotating the phase of the whitening cross spectrum R (ω) using the first difference in time of arrival Ti as illustrated in Equation 4 below.

$$R'(\omega) = e^{-\omega(-\tau i)} \cdot R(\omega) \quad \text{Equation 4:}$$

Figure 4B:
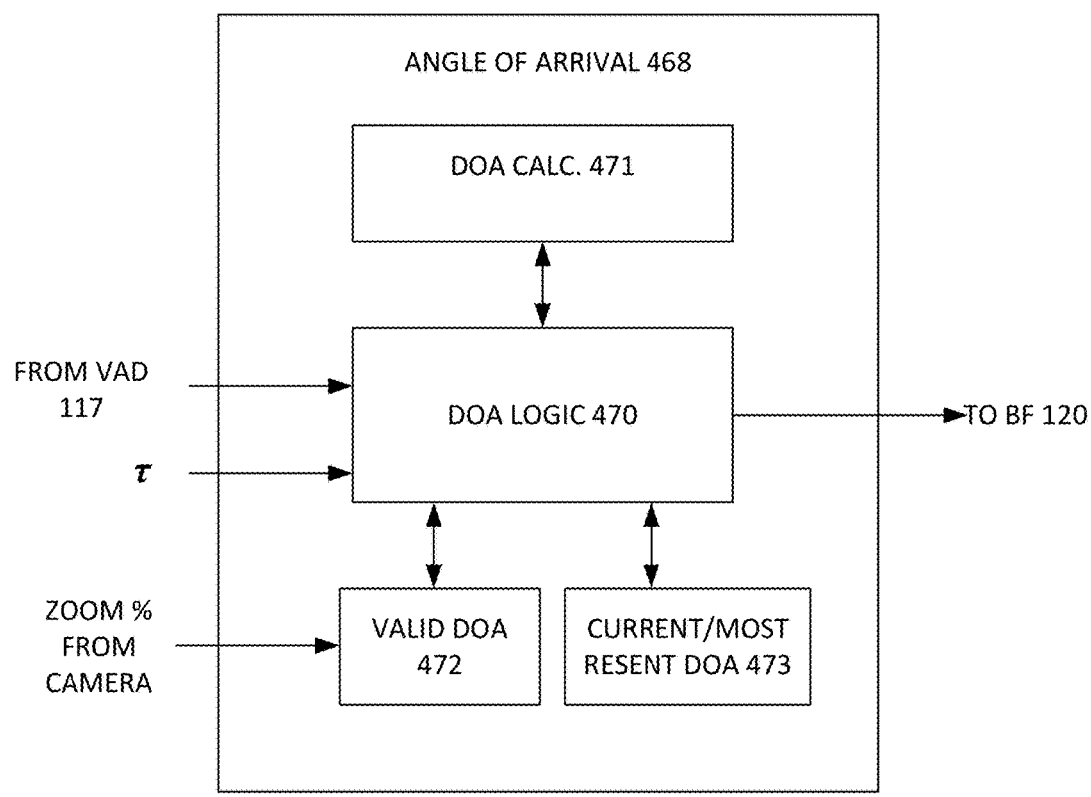
FIG. 4B illustrates functional elements comprising the angle of arrival function 468 comprising the DOA 118.
Figure 4C:
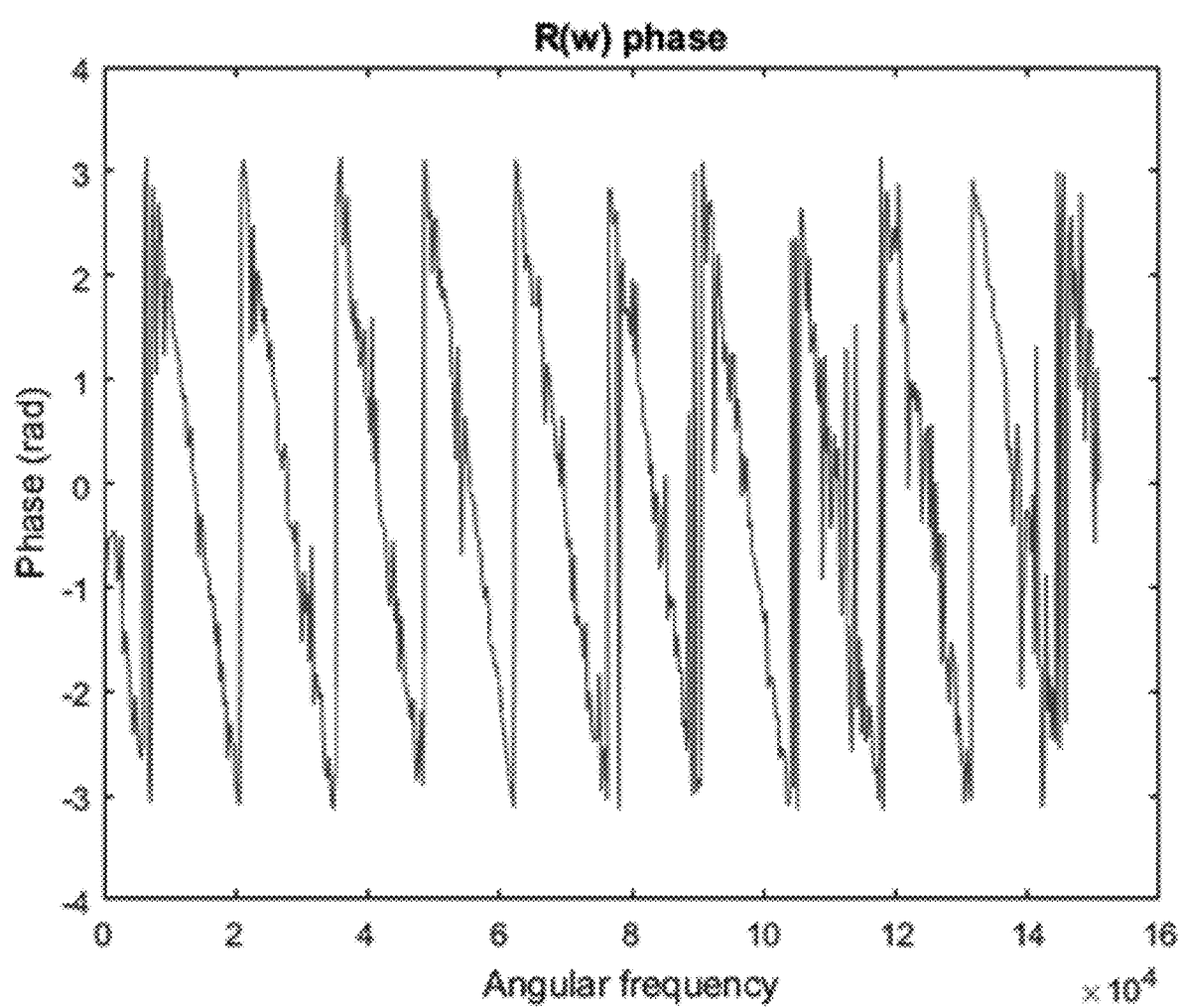
FIG. 4C is a diagram plotting microphone signal phase and angular frequency.

The whitening cross spectrum R(ω) is an angular frequency function and FIG. 4C shows the plot of R(ω) versus angular frequency for a sample audio signal. The DOA 118 computes the slope of these phase values which corresponds to the difference in time of arrival of the audio signal. This time difference is expressed in integer number of audio samples. However, because the phase values are not smooth in the angular frequency domain (as illustrated in FIG. 7), calculating the slope accurately from it is a challenge. To resolve this, the whitening cross spectrum R(ω) is transformed to the time domain. By calculating the sample number corresponding to the peak of the transformed whitening cross spectrum, a time offset τi is obtained. The phase rotation unit 463 rotates the phase of the original whitening cross spectrum R (ω) using this newly obtained time offset τi. Subsequently, the subsample delay τf is obtained from the slope of this rotated whitening cross spectrum R'(ω) using a least squares fit.

The time displacement calculation function 466 calculates the second difference in time of arrival, $\tau_f$ by calculating the peak of the whitening cross spectrum R'(ω) using the least squares method as shown in Equations 5 and 6 below.

$$\alpha(\omega) = \tan^{-1} \frac{img(R'(\omega))}{real(R'(\omega))} \quad \text{Equation 5}$$

$$\tau_f = -\frac{\sum \alpha(\omega) \cdot \omega}{\sum \omega^2} \quad \text{Equation 6}$$

However, because accuracy decreases in the high frequency domain when the sound source type is voice, it is desirable to remove a high frequency component from the sound/audio signal sample.

This second difference in time of arrival, $\tau_f$ corresponds to the peak position of the cross-correlation function in one sample (time displacement in one sample). The adder 467 adds the first difference in time of arrival, τi, with the second difference in time of arrival, $\tau_f$ to arrive a third difference in time of arrival, τ, which is the input, along with the voice activity flag signal from the VAD module 117, to the angle of arrival module 468. The angle of arrival calculation unit 468 finds the direction of arrival, represented in FIG. 2B as θ, of the voice using the third difference in time of arrival τ. As described earlier with reference to FIG. 2B, the direction of arrival of the voice, θ, is shown as an angle displacement with respect to the orientation of the front plane the conference system 110 housing (direction perpendicular to the surface on which the microphone 115A and the microphone 115C are aligned). If the distance between the microphone 115A and 115C is D1, and the speed of sound is C, the direction of arrival, θ, of the voice is calculated using Equation 7 below, with the distance D2 corresponding to the third difference in time of arrival, τ, between microphones, and is expressed as C·τ. in Equation 7.

$$\theta = \sin^{-1} \frac{C \cdot \tau}{D1} \quad \text{Equation 7}$$

Note that the angle of arrival calculation module 468 and the cross-correlation function calculation module 462 updates both the direction of arrival of the voice, θ, and the whitening cross spectrum, R(ω), when the voice flag is input from the voice activity detection unit (VAD) 117. The angle of arrival calculation unit 468 and the cross-correlation function calculation unit 462 maintain the previous direction of arrival, θ, and the whitening cross spectrum, R(ω), without renewing the direction of arrival, θ, of the voice and the whitening cross spectrum, R(ω), when the voice flag is not input from the voice activity detection unit (VAD) 117. Additionally, the processes associated with the operation of the cross-correlation function calculation unit 462, the phase rotation unit 463, the IDFT 464, the sample number calculation unit 465, the time displacement calculation unit 466, the adder 467, and the angle of arrival calculation unit 468 are omitted when the voice flag is not input. In this manner, unnecessary processing of sound information can be omitted, and the beamformer 120 does not receive sound source information other than a human voice.

FIG. 4B is a diagram illustrating the functionality comprising the angle of arrival module 468 described above. This module has DOA logic 470, a DOA calculation function 471, a store 472 in which is maintained one or more valid ranges of DOA angles (i.e., sound field of interest) each of which corresponds to a particular camera zoom angle or percentage, and a store 473 of current or most recent DOA angles. The logic 470 operates on information received from the VAD 117, which is the voice activity flag describe earlier, and the third difference in time of arrival, τ, information from the adder 467 to determine whether to calculate a current direction of arrival θ of sound information. More specifically, the logic 470 responds to a voice activity flag by sending information associated with τ to the DOA calculation function 471. The calculation function operates on the τ information to arrive at a current direction of arrival θ of voice information. The logic 470 then examines the valid DOA store 472 to determine if the current DOA angle θ calculated by the function 471 falls within a valid DOA range, and it examines the current/most recent DOA information, and if the current angle θ is a valid DOA, and if the most recent angle θ calculated by the function 471 is different than the current or most recent DOA, then the angle of arrival module 468 sends the currently calculated DOA angle θ to the BF 120.

As describe above, the result of the angle of arrival calculation, which is the direction of arrival θ, is sent to the beam forming unit (BF) 120 where it, and the output of each AEC (116A, 116B and 116C), is used to update filter coefficients comprising the BF. FIG. 6 is a diagram showing functionality comprising the BF 120 that operates, according to one embodiment, to steer a microphone array beam such that it captures sound information of interest (voice information from a source located in a sound field of interest) and attenuates other sound, such as sound information from a source that is not located in the sound field of interest.

Figure 5:
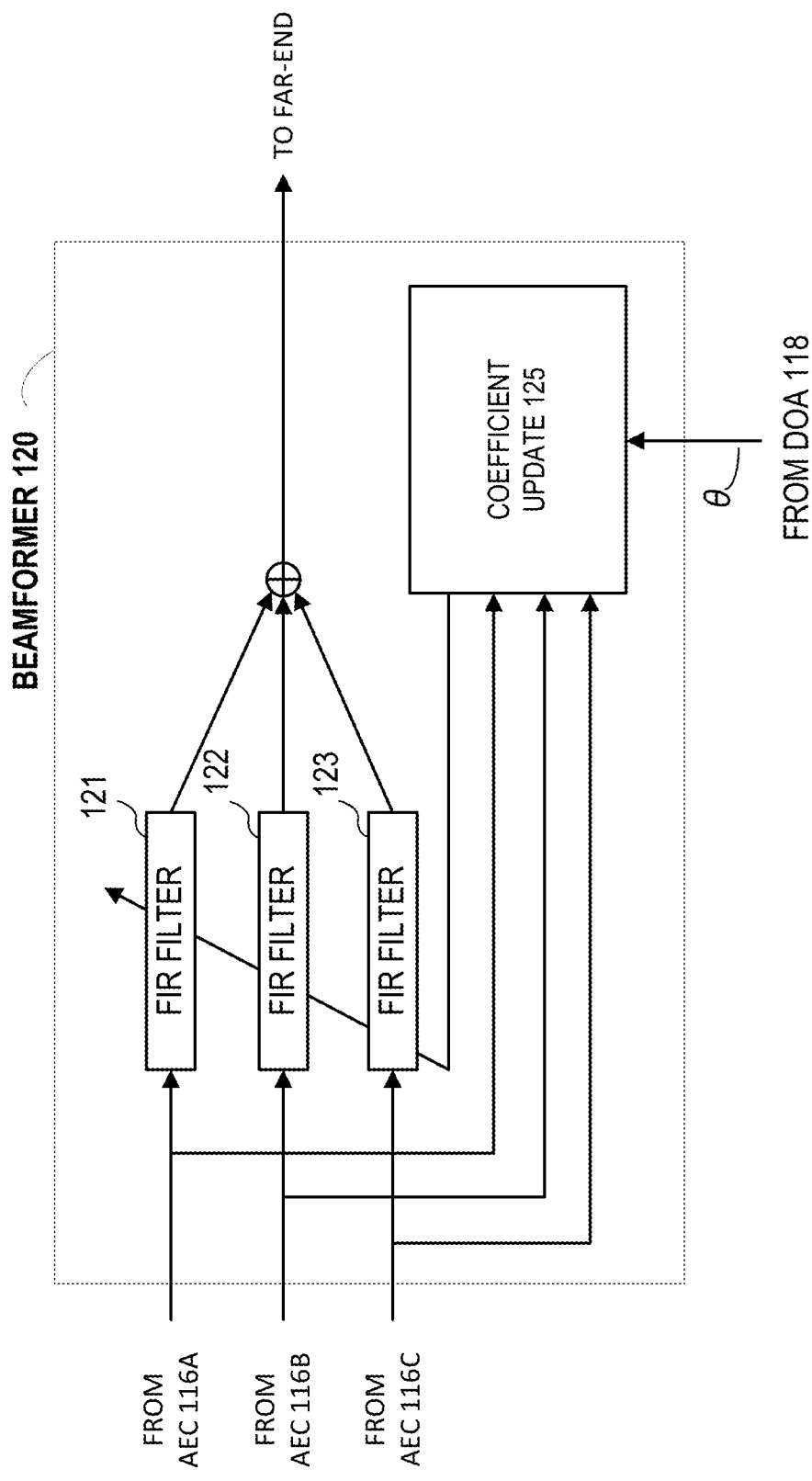
FIG. 5 is a diagram showing functional blocks comprising a beamformer.

The BF 120 illustrated in FIG. 5 is a filter and sum type beamformer having three FIR filters, 121, 122, and 123 each of which receives an echo removed audio signal from the respective acoustic echo cancellation functions, AEC 116A, 116B and 116C. While the BF 120 is described here as a filter and sum beamformer, other types of beamformers can also be implemented in the system 110, such as a delay and sum beamformer. Depending upon the application of the system 110, one or the other type of beamformer can be implemented. The FIR filters are configured as adaptive filters and operate to control the microphone beam to capture sound in the direction of a sound source of interest by filtering the three echo removed audio signals received from the three AEC functions. The information (the angle θ) from the DOA module 118 and the three echo removed audio signals received from the AEC functions are inputs to a coefficient update function 125, and this function operates on the DOA information and AEC signal information using a constrained LMS algorithm to calculate update coefficients for each of the FIR filters. Among other things, the update coefficients control whether or not, any of the three FIR filters apply a delay to the AEC signal, and if a delay is to be applied, how long the delay is. The degree to which delay is applied to each signal determines the direction in which the microphone beam is steered to capture sound arriving at the angle θ.

As described earlier, beamformers typically operate to steer a beam to the direction of sound arriving at a microphone array. However, if a conferencing system has a camera with a particular field of view, sound sources outside this field of view are typically of no interest to participants in a conference call. This operation of the BF to steer a beam toward unwanted sound can denigrate the quality of a conference call by, among other things, leading to confusion with respect to the source of sound during a conference call or by allowing the conference system to process sound that is not germane to a conference call.

While the BF 120 can be controlled to completely cancel sound from a direction that is outside the sound field of interest, doing so results in audio that is perceived by a far-end device as being choppy (sound/no sound), as the near-end sound is alternatively transmitted or not transmitted. According to an embodiment, the signal level of sound arriving at the conference system 110 from a direction that is not within the field of interest can be attenuated to a degree that is configurable. Attenuating this sound enhances the conference call experience by transmitting a continuous stream of sound generated from directions within the field of interest, while at the same time attenuating, to a greater or lesser degree, sound arriving from a direction outside the sound field of interest. Further, the degree of attenuation can be variable depending upon the DOA of the undesirable sound. For example, if sound arrives at the microphone array from a direction that is just outside the sound field of interest, this sound can be attenuated less than sound arriving at the array from a direction that is further outside the sound field of interest. For example, provided the sound field of interest is a 90° radius in front of the microphone array that extends 45° to either side of a plane that is normal to the orientation of the array (such as the plane 210 in FIG. 2B), and if a DOA of sound is fifty degrees (50°) to one or the other sides of the plane, then this sound can be attenuated less than sound which arrives at the array from an angle that is 60° to either side of the normal plane. The methodology employed to determine an amount of attenuation that is applied to this audio signal can be calculated or can be configurable, and this attenuation can be applied by any standard audio attenuation module (not shown).

We claim:

1. A method for controlling the direction of a microphone array beam, comprising:
   determining that a first acoustic signal corresponding to voice activity generated by a first sound source arrives at the microphone array from a direction that is within a current sound field of interest, and controlling the operation of a beamforming function to steer the microphone array beam towards the direction of arrival of the first acoustic signal, wherein the beamforming function operates to only steer the microphone array beam toward the direction of an acoustic signal that arrives at the microphone array from within the current sound field of interest, and the current sound field of interest is variable and corresponds to a video camera field of view that is variable;
   determining that a second acoustic signal corresponding to voice activity generated by a second sound source arrives at the microphone array from a direction that is outside the current sound field of interest during the time that the microphone array beam is steered to the direction of the acoustic signal generated by the first sound source; and
   controlling the beamforming function to attenuate the second acoustic signal by preventing it from steering the microphone array beam forwards the second spend source during a time that it is determined that the first acoustic signal is no longer arriving at the microphone array.

2. The method of claim 1, wherein the amount of attenuation is calculated or predetermined.

3. The method of claim 1, wherein the camera field of view is variable.

4. The method of claim 1, wherein the beamforming function is prevented from steering the microphone array beam towards the second sound source by disregarding the direction of arrival of the acoustic signal generated by the second sound source.

5. The method of claim 4, wherein the direction of arrival of the acoustic signal generated by the second sound source does not correspond to a valid direction of arrival.

6. The method of claim 5, wherein a valid direction of arrival is any direction of arrival that falls within the sound field of interest.

7. The method of claim 1, wherein a degree to which sound energy associated with the acoustic signal generated by the second sound source is attenuated depends upon the value of the invalid direction of arrival of that acoustic signal.

8. A video conferencing system, comprising:
   an array of two or more microphones disposed in a plane along a front surface of the video conferencing system that operates to receive acoustic signals;
   acoustic echo cancellation functionality associated with each one of the microphones in the microphone array;
   a voice activity detector for determining that the acoustic signals arriving at the microphone array correspond to voice activity;
   a direction of arrival function that operates to determine a direction of arrival of the acoustic signal and to determine whether the direction of arrival of the acoustic signal is from a direction that is within or outside a current sound field of interest, wherein the current sound field of interest corresponds to a current video camera field of view; a microphone array beamformer; and a camera having a fixed or a variable field of view: wherein a first acoustic signal is received by the microphone array that corresponds to voice activity and is determined to arrive from a direction that is within the sound field of interest and the beam former steering a microphone array beam towards the first acoustic signal, and a second acoustic signal is received by the microphone array that corresponds to voice activity and is determined to arrive from a direction that is outside the sound field of interest, and preventing the beamformer from steering the beam away from the direction of arrival of the first acoustic signal during a time that the second acoustic signal arrives at the microphone array whether or not the first acoustic signal generated by the first sound source is currently arriving at the microphone array whether or not the first acoustic signal generated by the first sound source is currently arriving at the microphone array.

9. The video conferencing system of claim 8, further comprising calculating an amount of attenuation to apply to the second acoustic signal based on the direction of arrival of the signal, and applying the calculated amount of attenuation.

10. The method of claim 8, wherein the camera field of view is variable.

11. The method of claim 8, wherein the beamforming function is prevented from steering the microphone array beam towards the second sound source by disregarding the direction of arrival of the acoustic signal generated by the second sound source.

12. The method of claim 11, wherein the direction of arrival of the acoustic signal generated by the second sound source does not correspond to a valid direction of arrival.

13. The method of claim 12, wherein a valid direction of arrival is any direction of arrival that falls within the sound field of interest.

14. A method for controlling the direction of a microphone array beam, comprising:
   determining that an acoustic signal corresponding to near-end voice activity generated by a sound source arrives at the microphone array from a direction that is outside a current sound field of interest, wherein the current sound field of interest corresponds to a current video camera field of view; and
   preventing a microphone array beamforming function from steering a variable beam toward the direction of arrival of the acoustic signal while attenuating sound energy associated with the acoustic signal, and a degree to which the sound energy associated with the acoustic signal is attenuated is based upon the angle at which the acoustic signal arrives at the microphone array.

15. The method of claim 14, wherein the amount of attenuation is calculated or predetermined.

16. The method of claim 14, wherein the camera field of view is variable.

* * * * *